United States Patent Office 3,286,179
Patented Nov. 15, 1966

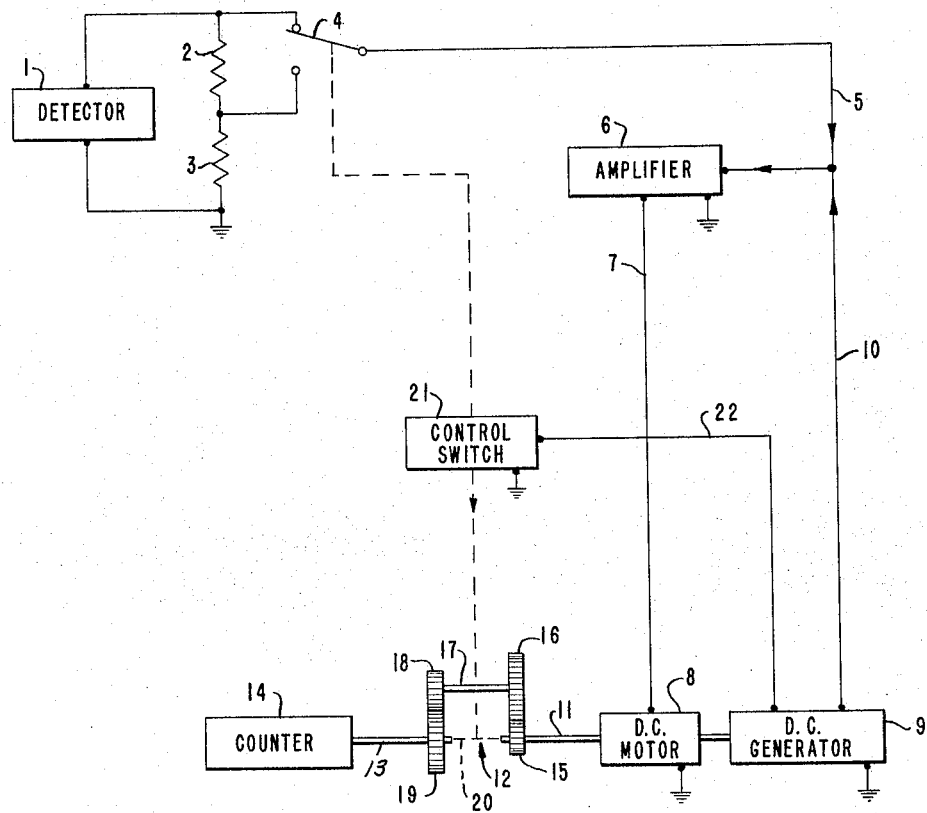

3,286,179
PLURAL RANGE ELECTRO-MECHANICAL INTEGRATING APPARATUS HAVING VARIABLE TRANSMISSION RATIO GEAR ASSEMBLY TO PROVIDE FOR CONSTANT RATE RECORDING
Albertus Schuringa, Amsterdam, Netherlands, assignor to Shell Oil Company, New York, N.Y., a corporation of Delaware
Filed Oct. 31, 1962, Ser. No. 234,491
Claims priority, application Netherlands, Apr. 27, 1962, 277,714
3 Claims. (Cl. 324—115)

The invention relates to a method and an apparatus for determining the time-integrated value of an electrical signal. The invention is particularly important when the electrical signal is derived from a detector used in carrying out a chromatographic, and especially a gas chromatographic separation. In this case it is not so much the time integral of the complete signal which is of importance as the time integral of each separate peak shown by the signal. In general the time integrals of both the high and the low peaks should be accurately determined, and the present method and apparatus enable this to be done in a relatively simple manner. If negative peaks occur (measured with respect to the base line), these may be commuted for example with the aid of a programming unit.

It is known that the integrated value of the signal can be determined by supplying the signal to an electric motor of which the momentary speed of rotation is at least substantially proportional to the magnitude of the electric signal supplied. The shaft of the motor is coupled to an apparatus which can measure and if desired record the value of the signal integrated over the time. An apparatus of this kind may, for instance, consist of a counter which counts and records the number of revolutions of the shaft, the difference between the initial and the final position of the counter indicating the value desired. When this apparatus is used in gas chromatography, the position of the counter is recorded at the beginning of the chromatographic separation and after the appearance of each peak. If desired, the position may be recorded immediately before and directly after the appearance of a peak. In this manner the contribution of each peak (which corresponds to the presence of a certain substance or of a certain group of substances in the mixture analyzed chromatographically) may be calculated and recorded.

In some cases a motor-generator system is used in which the voltage produced by the generator is fed back to the supplied signal by leading both to the input terminals of an amplifier, the output voltage of which forms the supply voltage of the motor. This ensures that, at least within a certain range, the motor speed now runs linearly with the supplied signal.

The known method has, however, one great disadvantage, viz. the integrated values corresponding to high and low peaks cannot both be measured with reasonable accuracy. If the magnitude of the signal supplied to the motor is such that the large signals still come within the linear range of the motor, then the accuracy with which the low peaks are measured is far too low. It may then happen that the low peaks correspond to a signal to which the motor no longer responds. If, however, the magnitude of the signal is such that the motor is able to measure the low peaks, the signal of the high peaks is so great that linear conversion is no longer possible.

The invention now provides an apparatus which obviates this drawback.

According to the invention the electrical signal is passed through an electrical circuit capable of attenuating the signal before it is supplied to the motor which is connected to the measuring apparatus via a coupling element capable of increasing the transmission ratio between the motor shaft and the measuring apparatus to the same extent that the signal was reduced by the attenuating circuit. The attenuation of the signal and the increase in the transmission ratio are controlled in such a way that both are simultaneously switched on or off, as the case may be.

The time at which the attenuation of the signal and increase in the transmission ratio are switched on or off is usually determined by the magnitude of the electrical signal. Whenever the signal exceeds a certain, possible adjustable value, the attenuation is switched on and the transmission ratio simultaneously increased; if the signal then becomes smaller than a certain, possibly adjustable value, the attenuation of the signal and the increase in the transmission ratio are both simultaneously annulled. The value of the signal at which switching-on takes place need not be the same as that at which switching-off takes place. In practice, however, these values will only differ slightly. If, as frequently occurs in chromatographic uses, the course or shape of the signal is known in advance, then the times at which the attenuation of the signal and the increase in the transmission ratio are switched can be preset independently of the momentary magnitude of the signal, for example, by a programming unit.

Increasing the transmission ratio is of course, equivalent to switching off a reduction already introduced in the transmission ratio of the connection between the motor shaft and the measuring apparatus, whilst annulling the increase is equivalent to switching this reduction on again.

The apparatus preferably used according to the invention is characterized by an attenuator circuit in the supply line of the signal to the motor; by a coupling element with variable transmission in the drive of the apparatus which measures the time-integrated value of the signal and, if desired, records it; and by a control switch, such as a relay, commanded by the electrical signal or a signal derived therefrom, or by the signal of a programming unit, which control switch is capable of simultaneously influencing the degree of attenuation and the transmission ratio. When a motor-generator system is used, the control switch is preferably commanded by the generator voltage.

The attenuator circuit is preferably formed by a series connection of at least two resistances, to which the electrical signal in connected, and by a switching device for transmitting either the total voltage or part of the voltage of the series connection. Although in most cases it is sufficient to have only a single stage of electrical attenuation, it is understood that more than one stage can also be used if required. This would, of course, require corresponding additional stages of increase in the transmission ratio; in this way the linear range of the present apparatus can be extended still further.

Instead of, or as well as a mechanical increase in the transmission ratio of the rotation of the motor shaft to the apparatus coupled to this shaft, an increase in the transmission ratio in the apparatus itself may be effected. This is of particular value when the result of the measurement is not recorded directly by mechanical means, but the value of the angle covered by the motor shaft, which is proportional to the value of the time integral required, if first converted into a different entity. This occurs, for instance, when the apparatus gives a series of impulses, e.g. electrical impulses, the number of which is a measure of the time integral. When the signal is attenuated, it is now possible to use at the same time an increase in the number of impulses produced per unit of angular displacement of the motor shaft, or if preferred, an electrical frequency multiplier may be switched on. This latter step is equivalent to switching off a frequency divider when a divider of this type is present and is functioning at the time the unattenuated signal is transmitted to the motor. The impuses may be produced with the aid of a perforated disc driven by the motor shaft, a stationary source of light, and a stationary light-sensitive cell, which converts into electrical impulses the light passing through the perforations in the disc. The transmission ratio can now be varied by varying the number of perforations admitting light through the disc.

The invention will be demonstrated in greater detail with reference to the appended drawing, which shows a diagram of an apparatus for determining the integrated value of a signal derived from a chromatographic detector, and in particular for determining the areas below the different peaks in the chromatogram.

After any amplification desired the electrical signal derived from the detector 1 is fed to an attenuator circuit which consists of two resistors 2 and 3 connected in series. By means of a switch 4 it is possible to pass on the total voltage applied to the series connection (top position) or the voltage applied to the resistor 3 (bottom position). The voltage taken by the switching device 4 passes via a line 5 to an amplifier 6, the output voltage of which is passed via a line 7 to a direct-current motor 8. The shaft of this motor is coupled to a direct-current generator 9. The current produced by the generator 9 is carried by a line 10 to the input of the amplifier 6. This ensures that there is a linear relationship, at least very approximately and within a certain range, between the momentary speed of rotation of the motor-generator combination and the detector signal supplied. Hence the speed of rotation of the motor shaft is a measure of the magnitude of the detector signal.

The motor shaft 11 is also coupled by means of a coupling with variable transmission 12 and a shaft 13 to a device 14 preferably a counter which is capable of measuring and recording the time-integrated value of the signal.

The coupling 12 is formed by a gear-wheel 15 carried on the shaft 11 and meshing with a gear-wheel 16 mounted on an auxiliary shaft 17; this auxiliary shaft also carries a gear-wheel 18 which meshes with a gear-wheel 19 on the said shaft 13. It is also possible for the shafts 11 and 13 to be directly coupled via a connection 20. In addition, the system 12 is equipped in such a way that shafts 11 and 13 either are coupled via the gear-wheels 15 and 16, the auxiliary shaft 17 and the gear-wheels 18 and 19 (reduction coupling), or are coupled via the direct connection 20. Which of the two connections is or will be switched on at a given moment is determined by a control switch 21 which also simultaneously determines the position of the switching device 4. If the unattenuated signal (top position of switching device 4) is transmitted, shafts 11 and 13 are mechanically coupled by means of the reduction gear unit. On the other hand, if the attenuated signal (bottom position of the switching device 4) is transmitted, then the shafts 11 and 13 are directly coupled via the direct connection 20. The control switch 21 is commanded by the magnitude of the voltage produced by the generator 8, and to this end the generator voltage or a part thereof is fed via a line 22 to the control switch 21. As shown in the drawing, the control switch 21 is mechanically coupled to the switching device 4 and the coupling 12. It is of course understood that electrical or electro-magnetic coupling may be used if desired.

In a practical embodiment of the apparatus shown in the diagram the electrical attenuation may be nine-fold (the value of the electrical resistance of resistor 2 will then be eight times the value of the resistor 3); the transmission ratio via the gear-wheels 15/16 and 18/19 (belonging to the unattenuated signal) will then be 1/9, each of the gear-wheel units produces a three-fold reduction.

The apparatus then operates as follows: When measuring commences switching device 4 will be in the top position, the gear-wheel unit being switched on at coupling 12.

When the signal from detector 1 begins to deviate from zero indicating the start of the first peak, a voltage is supplied to the motor 8 which causes the latter to rotate at a speed of rotation proportional to the magnitude of the incoming signal. This speed is reduced nine times on the shaft 13 and then transmitted to the device 14, which records the number of revolutions of the shaft 13. If the signal then exceeds a given magnitude, the voltage in line 22 exceeds a corresponding value and the control switch 21, which may consist of a relay, then simultaneously switches the switching device 4 and the coupling 12. The signal to the motor is then attenuated nine-fold, but a direct coupling is established between the shafts 11 and 13 instead of the nine-fold reduction. The speed of rotation of shaft 13 is not therefore effected by the switching and the counter 14 can therefore continue to count the number of revolutions in the usual way. The switching device 4 is suitably switched to the bottom position just before the maximum permissible number of revolutions of the motor 8 has been reached. When the top of the peak has passed and the signal falls below a certain value the attenuation of the signal and the increase in the transmission ratio between the shafts 11 and 13 are annulled, again simultaneously, because the relay 21 is switched back to its original position. The magnitude of the signal at which this relay is switched back is not necessarily the same as that at which switching took place, but usually there is little or no variation in the value of these signal magnitudes.

If each peak or a number of peaks of the signal or certain parts of the signal have to be measured separately, as is usually the case in chromatographic use, the device 14 should receive an indication that a peak has passed. Since it is usually known exactly when a peak arrives and when it has passed, the apparatus according to the invention can be provided with an automatic timing device or programming unit which transmits the relevant indicating signal to the device 14 so that it is possible to record the revolutions of the shaft 13 (which is a measure of the time-integrated value of the signal) pertaining to the peak measured. The programming unit gives the relevant indicating signals for each new peak to be measured. It is also possible to transmit the detector signal to a special apparatus, i.e. a signal-slope detector, which observes whether a peak appears and, possibly, when it disappears. If the moment the peaks appear is not known in advance, the detector of this type must be used in order to measure the separate peaks.

Using the above-described apparatus, the range within which the time integral of the signal can be determined is increased nine-fold compared with the known apparatus in this range.

It is, of course, also possible to use a different degree of electrical attenuation and mechanical increase of the transmission. In addition, it is also possible to use other mechanical transmissions, such as a planetary gear unit, as known in the art of gearbox engineering. It is, however, always essential to ensure that both switchings, the electrical and the mechanical, occur simultaneously, although the point at which the control switch switches need not always be exactly the same. The switching may also take place in more than two stages. The motor used had a time constant of approximately 0.02 sec.; the control switch used operated of approximately 0.1 sec.

The device 14 need not be a counter but should be capable of measuring and/or recording in some way a number of revolutions or parts thereof of the shaft 13 for the whole signal and/or for each of the separate peaks. The measuring or recording need not be done mechanically.

In the embodiment shown the unattenuated signal belongs to the nine-fold reduction and the attenuated signal to the direct coupling; it would also have been possible to use the unattenuated signal with the direct coupling, and a nine-fold acceleration (pertaining to an exchange of the gear-wheel 15 for the gear-wheel 16, or gear-wheel 18 for gear-wheel 19) with the attenuated signal.

Instead of commanding the control switch 21 by the electrical signal or by a signal deriver therefrom (or the signal from the generator 9), it is possible to command it by a programming unit. In this case the programming unit determines at which predetermined times the control switch has to switch on or off the switching device 4 and the coupling 12 respectively.

Obviously, various modifications of the present invention are possible in view of the above teachings. It is therefore to be understood that the invention is not limited to the particular form illustrated but is capable of embodiment in other forms without departing from the spirit and scope of the appended claims.

I claim as my invention:

1. Apparatus for determining the time integrated value of an electrical signal comprising:
   (a) an input terminal;
   (b) a resistor, said resistor being connected between said input terminal and ground, a switch means connected to said input terminal for passing said signal directly, said switch means being also connected to a preset point along said resistor for passing an attenuated value of said signal, the position of the switch means to transmit the direct value of said signal corresponding to a first condition and the position of the switch means to transmit the attenuated value of said signal corresponding to a second condition;
   (c) a direct current motor, said direct current motor being coupled to said switch means;
   (d) a variable transmission ratio gear assembly, said variable transmission ratio gear assembly being coupled to said direct current motor, said variable transmission ratio gear assembly transmitting the output of said direct current motor directly when the switch means is in said first condition and multiplying the output of said direct current motor by a factor equal to the ratio of the unattenuated value to the attenuated value of said signal when said switch means is in said second condition;
   (e) first means coupled to said switch means and said variable transmission for simultaneously switching said switch from said first condition to said second condition and said variable transmission from said direct transmission to said multiple transmission when the magnitude of said signal exceeds a preset value and returning said switch means to said first condition and said variable transmission to said direct transmission when the magnitude falls below a preset value; and
   (f) second means coupled to said variable transmission to measure a quantity related to the output of the variable transmission.

2. The apparatus of claim 1 wherein said switch is connected to said direct current motor through an amplifier, an electrical generator, said electrical generator being coupled to the rotor of said direct current motor, and means connecting the output of said generator to the input of said amplifier.

3. The apparatus of claim 2 wherein said first means comprises a relay connected to the output of said generator and disposed to move said switch from the first condition to the second condition.

References Cited by the Examiner

UNITED STATES PATENTS

| | | | |
|---|---|---|---|
| 2,000,736 | 9/1935 | Ballantine | 324—116 |
| 2,638,493 | 5/1953 | Trischka | 324—139 X |
| 2,886,770 | 9/1959 | Jackson | 324—99 X |
| 2,981,107 | 4/1961 | Anderson | 324—115 X |
| 3,207,985 | 9/1965 | Masavage | 324—115 |

FOREIGN PATENTS 802,272   10/1958   Great Britain.

WALTER L. CARLSON, *Primary Examiner.*
RUDOLPH V. ROLINEC, *Examiner.*
J. J. MULROONEY, *Assistant Examiner.*